US005156357A

United States Patent [19]

Rollingson et al.

[11] Patent Number: 5,156,357

[45] Date of Patent: Oct. 20, 1992

[54] MICRO-T TELEMETRY SYSTEM

[75] Inventors: Larry L. Rollingson; Richard G. Drake; Kenneth P. Lusk, all of Ridgecrest, Calif.

[73] Assignee: The United States of America as represented by the Secretary of the Navy, Washington, D.C.

[21] Appl. No.: 406,686

[22] Filed: Aug. 2, 1982

[51] Int. Cl.[5] .............................................. H04B 1/04

[52] U.S. Cl. ............................... 244/3.14; 340/870.07

[58] Field of Search ............................... 244/3.14, 3.1; 340/870.07, 870.01, 870.16, 870.21

[56] References Cited

U.S. PATENT DOCUMENTS

| | | | |
|---|---|---|---|
| 3,210,747 | 10/1965 | Clynes | 340/206 |
| 3,364,466 | 1/1968 | Stine | 340/147 |
| 3,815,109 | 6/1968 | Carraway et al. | 340/207 |
| 3,887,873 | 6/1975 | Duncan et al. | 325/113 |
| 4,011,551 | 3/1977 | Adler | 340/189 |

*Primary Examiner*—Salvatore Cangialosi

*Attorney, Agent, or Firm*—Melvin J. Sliwka; John Forrest

[57] ABSTRACT

A small telemetry system for small diameter missiles uses a combined wraparound antenna, discreet circuit boards, and heat-sink bulkheads to achieve a small telemetry system to replace the payload on such missiles.

10 Claims, 4 Drawing Sheets

MICRO-T TELEMETRY SYSTEM

BACKGROUND OF THE INVENTION

1. Field of the Invention

This invention pertains to field of electro-mechanical design. More particularly, this invention pertains to the field of aerial missile construction. By way of further characterization, this invention pertains to the field of electro instrumentation and telemetry. By way of further characterization, but without limitation thereto, this invention pertains to the field of radio frequency telemetry for use in a small diameter aerial missile.

2. Description of the Prior Art

A very effective class of weapons evolved from modern warfare have been small diameter aerial missiles. These weapons may be easily transported to remote sites and with a minimum of launch apparatus used to interdict distant targets including aerial targets. A wide variety of guidance systems is used to direct these missiles to their targets. Because of the wide spread acceptance of this class of missiles a need has arisen for accurate analysis of their flight conditions for use in weapon development as well as in training of operational crews.

Although the general field of telemetry provides hope for such missile instrumentation, to date no package has been developed which is sufficiently small to replace the payload on these missiles to permit an accurate analysis of their flight in real time conditions or to be used to train launch crews. That is, prior telemetry packages have been so bulky and of such excess weight that when the payload is replaced by the telemetry package adverse aerodynamic results cause the missile to perform in an abnormal fashion. What has been needed is a plural channel telemetry system which can transmit back to the ground launch point, or to training crews, the various electrical parameters for the short flight of such missiles. Prior telemetry systems have required excessive power supplies or connection to the power supply of the missile itself. Such an artificial load effects the performance of the missile and detracts from the quality of the telemeter results.

SUMMARY OF THE INVENTION

The present invention utilizes a combination of advanced mechanical design and state-of-the-art electronic circuitry to arrive at a lightweight, self powered, missile telemetry system which provides multi channel operation in an acceptably small package. The power supply of the missile is monitored as well as the power supply of the telemetry unit such that an accurate calibration of telemetered results is possible. Additionally, the acceleration along three axes and a wide variety of a missile functions including a plurality of missile voltages, a roll function, a solenoid function, an automatic gain control function, gyro functions, cage function and other electronic parameters conventional in the missile analysis arts. The various circuits which produce electrical analogs of these functions are connected to a commutator which alternately selects the outputs of various channels in a predetermined sequence and connects them to a state-of-the-art microwave transmitter for rebroadcast to the ground station.

It is accordingly an object of this invention to provide an improved telemetry system.

A further object of this invention is to provide a telemetry system capable of replacing the warhead on small diameter aerial missile.

A further object of this invention is to provide a self powered telemetry system which monitors a wide variety of missile functions.

These and other objects of an attendant advantageous, features, and uses of the invention will become more apparent to those skilled in the art as a more detailed description proceeds when considered along with the accompanying drawings.

DESCRIPTION OF THE PREFERRED EMBODIMENT

Figure 1:
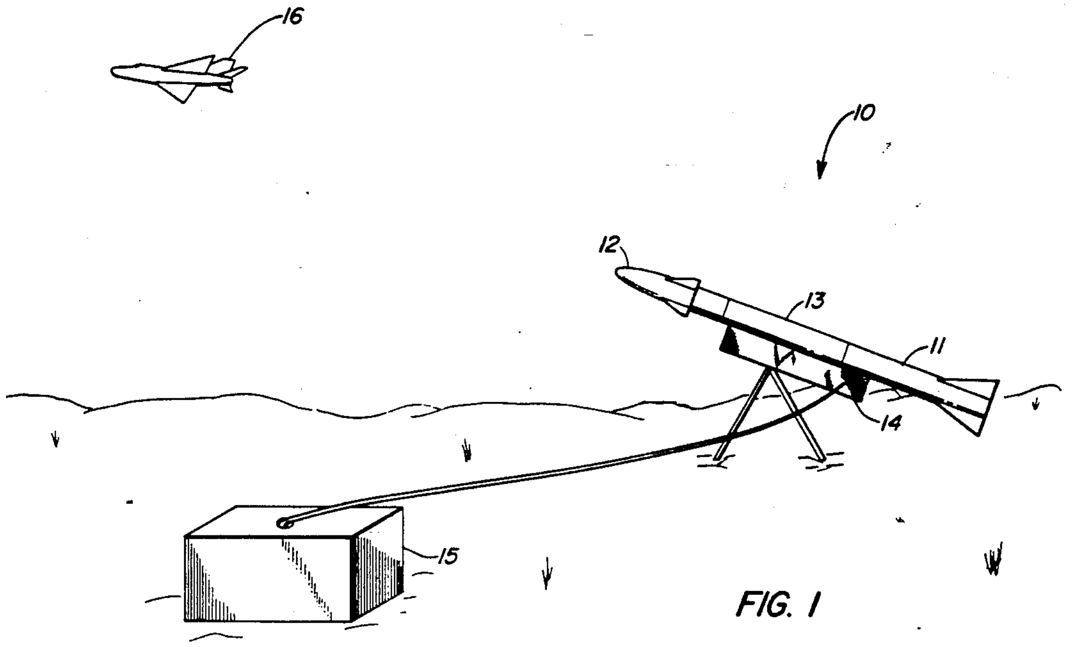
FIG. 1 is a perspective view showing the system of the invention in an operational environment.

Referring to FIG. 1, the missile system utilizing the invention is illustrated generally at 10. A motor portion 11 contains solid propellant and stabilizing fins to provide the motive force and aerodynamic stability for the missile when in flight. A guidance section 12 located in the nose portion of the missile contains conventional guidance which may employ passive or active microwave techniques or infrared seeking guidance as is common and well understood in the missile arts. A telemetry package 13 is shown installed in the position normally occupied by the warhead of missile 10. It should be noted that telemetry section 13 is, by design, of the same weight and exterior configuration of the warhead which it replaces for use in training or analysis flights.

Missile system 10 is illustrated as being supported on a portable launch platform 14 to which is connected a launch electronics package 15 as is conventional in these weapons systems. It should be noted that launch electronics 15 and launch platform 14 are illustrative only as a general type. Other configurations and arrangements are possible with missiles of this class, and, in fact, many are launched from man-carried launch tubes rather than the platform arrangement illustrated.

In operation, a distant target, such as aircraft 16, is acquired by the guidance system 12 and such acquisition is signaled to the operators by conventional circuitry. The launch sequence is initiated and motor 11 ignited, by conventional means, and the missile commences flight under control of a guidance system 12. The flight of the missile is controlled by various outputs from the guidance system which are monitored by telemetry section 13 and transmitted back to the ground station by means of electronic circuitry to be more completely described.

Figure 2:
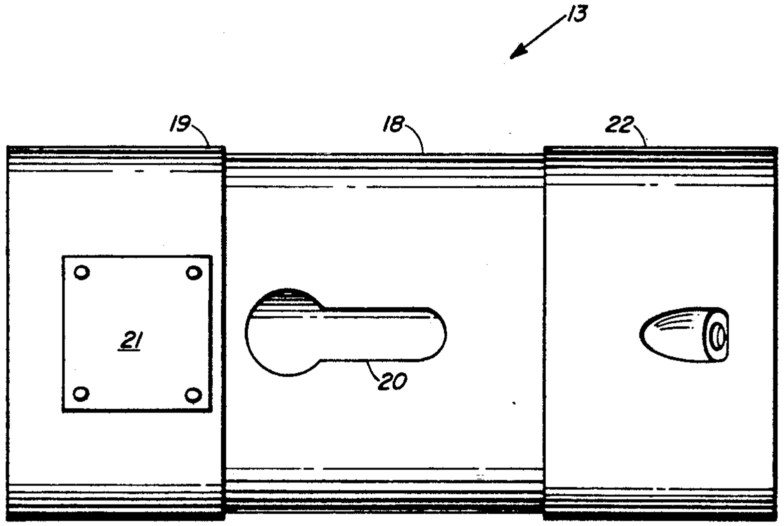
FIG. 2 is an elevational view of the exterior of the telemetry package according to the invention.

FIG. 2 is an enlarged view of the telemetry section 13 and illustrates several salient features observable from the exterior thereof. A central section 18 which is slightly depressed between a forward flange 19 and an aft flange 22 contains an antenna 20. Antenna 20 is recessed slightly to protect it during launch and the amount of recess is exaggerated for purposes of illustration clarity in the drawing. Antenna 18 is a micro strip, wraparound antenna of current state-of-the-art design. Forward flange 19 has a battery cover 21 which permits a thermal battery, to be more completely described, to be inserted and removed by maintenance personnel. The dimensions of forward flange 19 and aft flange 22 are made to accommodate the missile for which the telemetry is desired. For this reason, the specific details of attachment of telemetry section 13 within the small diameter airframe, has been omitted as these mechanical adaptions are common and form no part of the invention and vary from missile to missile.

Figure 3:
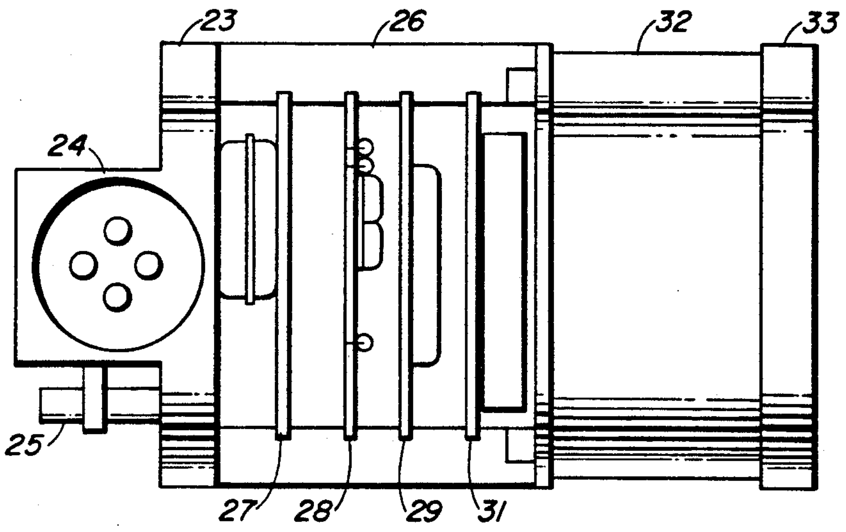
FIG. 3 is a view of the internal circuitry and mechanism of the telemetry unit shown in FIG. 2.

Referring to FIG. 3, the internal mechanism housed within telemetry section 13 is illustrated. A forward bulkhead 23 is made of relatively thick aluminum and is machined to receive a thermal battery which is held in place by a battery mount 24. The thickness and the size of the forward bulkhead 23 in addition to providing mechanical regidity, serve as a heat sink for the thermal energy generated by the thermal battery held within battery mount 24. An electrical connector 25 is also mounted on forward bulkhead 23 and serves the obvious purpose of interconnecting the telemetry section with the guidance section and is well understood in the telemetry and electronic arts. A plurality of mountings 26 are attached to forward bulkhead 25 and support a plurality of small circuit boards which are positioned transverse to the longitudinal axis of missile 10. A first circuit board 27 supports the power supply for the telemetry system which will be more completely described in connection with FIG. 4. A second circuit board 28 provides a special turbo alternator monitoring function which monitors the prime power generator for the missile during the brief flight thereof. A third circuit board 29 mounts a hybrid circuit comprising a plurality of operational amplifiers which are connected via connector 25 to the various sources of electrical signals being monitored by telemetry system 13. A fourth circuit board 31 supports a standard state-of-the-art commutator which, sequences the outputs of the hybrid operational amplifier circuit to a transmitter indicated at 32. Transmitter 32 is a standard state-of-the-art microwave transmitter which is housed in a cylindrical package of diameter chosen to be compatible with forward bulkhead 23. A fifth circuit board 33 is carried on an aluminum bulkhead forming the aft surface of transmitter 32 and supports the triaxel accellerometer which, like transmitter 32 is a standard, state-of-the-art circuit. Mounting 30 engages and provides a rigid support for the various circuit boards. The details of the mounting arrangement is described in the copending patent application by the coinventor K. Lusk and has a Ser. No. 295,353 the details of which form no part of this invention.

Figure 4:
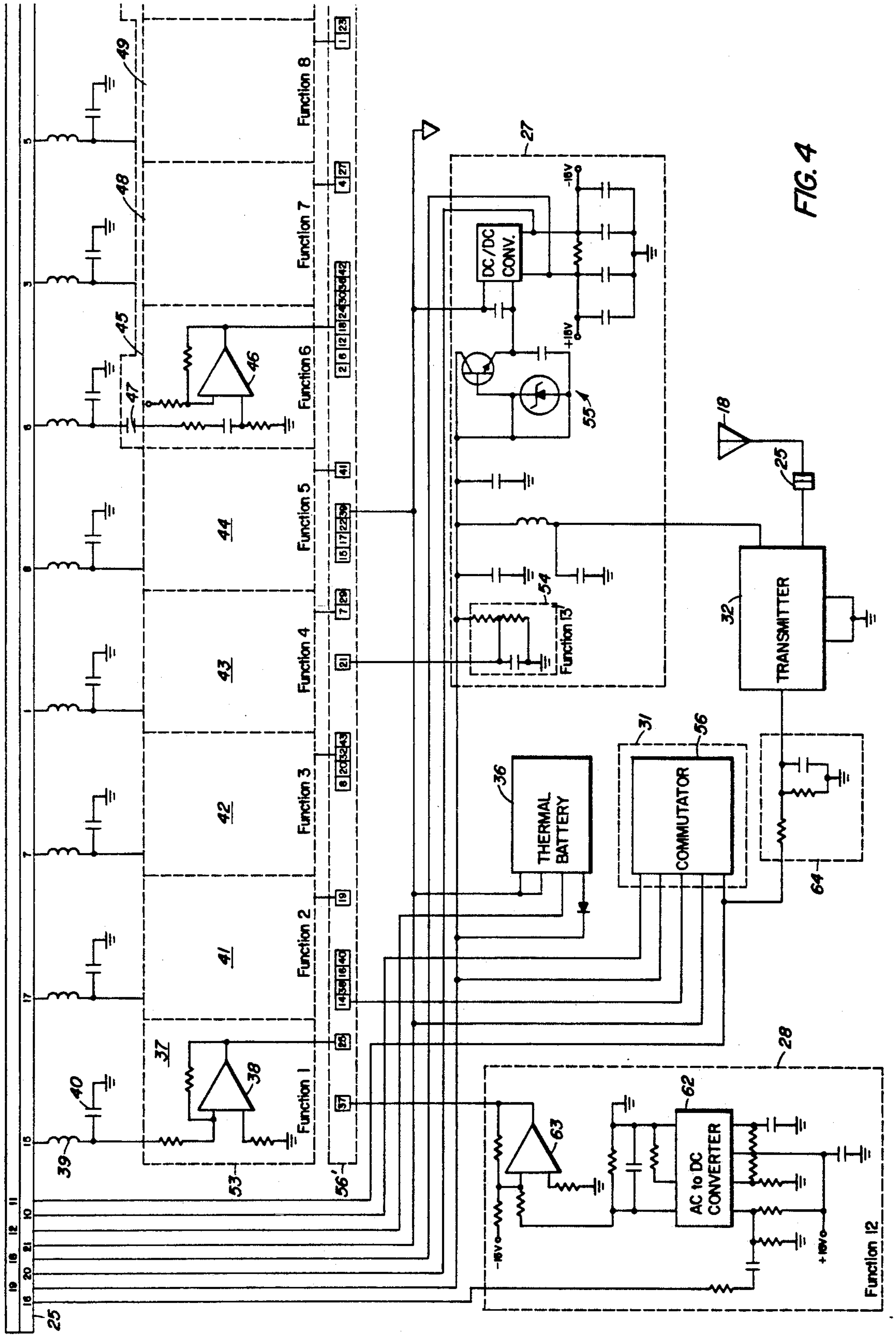
FIG. 4 is a schematic diagram of the electrical components as included in the invention.
Figure 4:
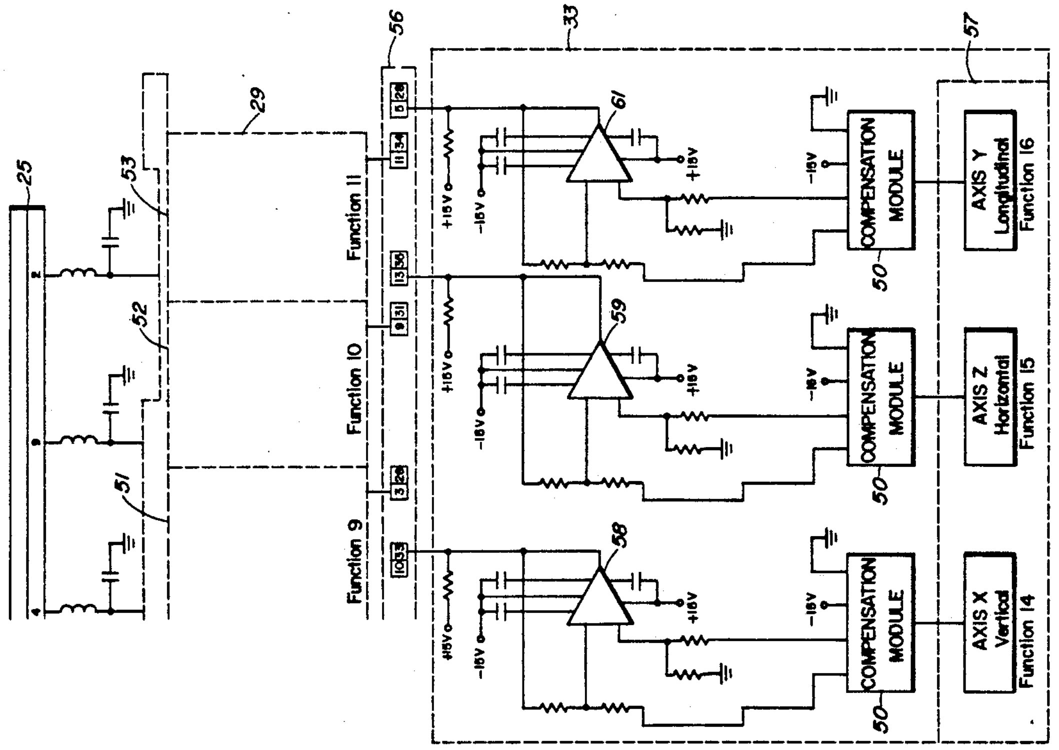

Referring to FIG. 4, the circuit diagram of the electrical portion of the invention is illustrated. Connector 25 connects the squib signal to initiate the operation of a thermal battery 36. Thermal battery 36, as previously noted, is mounted on the forward wall of bulkhead 23 which serves as a heat-sink and isolates the heat generated by thermal battery 36 from the remainder of the circuitry. The output of thermal battery 36 is, as indicated, a positive 28 volt signal which is fed to a bus line connecting various circuits including the transmitter 32. An external connection to connector 25 is also provided for the plus 28 volt bus such that the telemetry circuit may be operated prior to firing the squib thermal battery 26 as would be the case prior to launch. A 28 volt bus signal is fed to a power supply which is mounted on first circuit board 27 and contains a function pick-off illustrated at 54 as a voltage divider network such that the output of thermal battery 26 may be monitored. This output is connected to commutator 56 which is mounted on the fourth circuit board 31.

Commutator 56 is, for purposes of illustrative clarity, illustrated at two different positions on FIG. 4. The first long rectangular box 56′ includes the input terminal to commutator 56 and the block indicating commutator 56 is shown beside power supply 27 below thermal battery 36. Commutator 56 is a conventional, off-the-shelf and is a hybrid circuit. A variety of such circuits are available and the one used in the developmental models of the present invention is a 48 channel commutator produced by Aydin Vector Corp. as model MMC-405PC.

Connector 25 also connects a variety of signals from various circuits to be monitored to the plurality of channel amplifiers. One such channel amplifier 37 is illustrated for purposes of completeness and comprises an operational amplifier 28 which is connected in a conventional fashion to the signal source. Radio frequency shielding is provided by an indicator 39 and by pass capacitor 40 in a conventional fashion. Channel amplifiers 41, 42, 43 and 44 are essentially duplicates of channel amplifier 37 but connected so as to monitor other functions. Channel amplifier 45 illustrates a different species of connection of channel amplifiers and shows an operational amplifier 46 which is connected by means of a capacitor 47 to the radio frequency filter such that alternating signals of higher voltage may be applied to the control inputs of operational amplifier 46. Again, this is conventional practice in the telemetry arts. Channel amplifiers 48, 49, 51, 52 and 53 may be similar to either channel amplifiers 37, or 45, as required for the monitoring function.

The output of thermal battery 36 is connected to a power supply board 27 which includes a power monitor 54 which is also connected to an input of commutator 56 to provide monitoring of the output of thermal battery 36. A regulator 55 also is mounted on power supply board 27 and is used to control input to a DC-to-DC converter 56, which may be a state of the art device which supplies the plus and minus balanced power supply for the operational of the various channel amplifiers and other circuitry contained in the electronics package.

Figure 5:
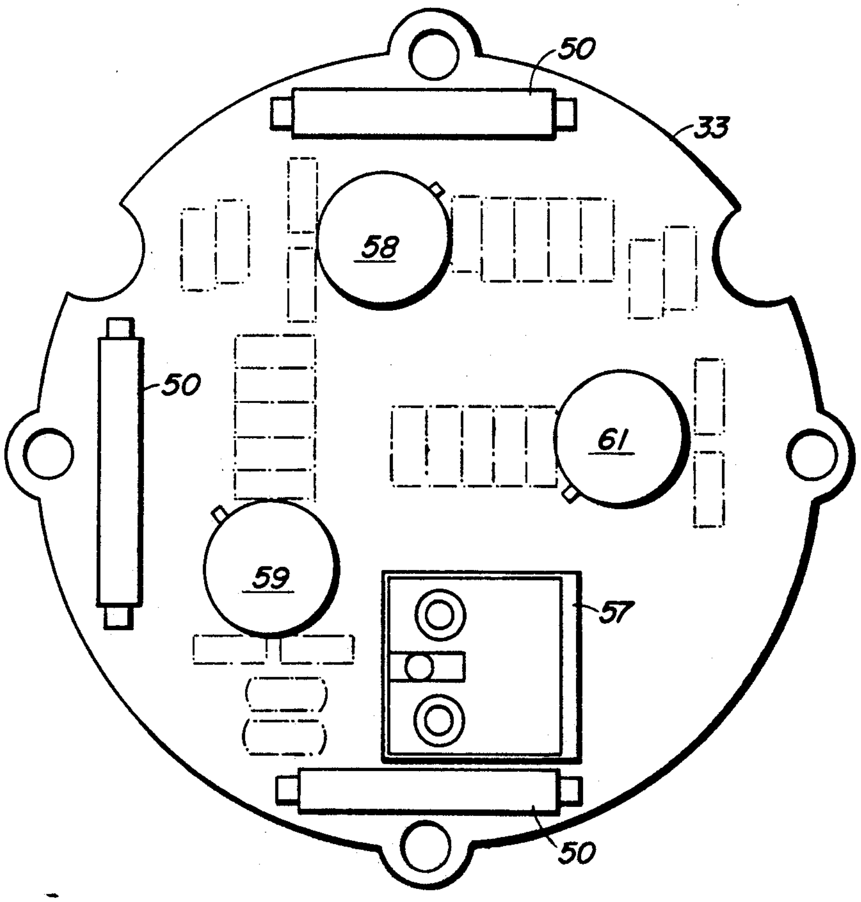
FIG. 5 is a view of the accelerometer mounting arrangement.

As discussed in connection with FIG. 3, a circuit board 33 is mounted on the back end of transmitter 32 and provides mounting space for a three axis accelerometer indicated at 57. Three axis accelerometer 57 is a conventional electronics component and selection among various models is within the purview of those versed in the art, for purposes of completeness however it should be noted that the Entran triaxis accelerometer model EGAL-3-125-20, 50,20 has been successfully employed in the present invention. The output of the three axis accelerometer 57 is fed through three compensation modules 50 manufactured by the same manufacture to be used with the three axis accelerometer 57 and to operational amplifiers 58, 59 and 61, the outputs of which are fed to commutator 56. The details of circuit board 33 are shown in FIG. 5.

Missiles of the type for which the system of the invention provides telemetry frequently have special purpose power supplies which have outputs beyond the normal voltage ranges monitored by standard missile telemetry circuit. Turbo driven alternators are one example of a power source commonly encountered. Provision is made to monitor the output of the missile turbo as to frequency by the circuit shown on the second circuit board 28. The output from turbo alternator is fed to a AC to DC converter 62 which produces a DC output in dependence upon the frequency of the AC input. This output is connected to a operational amplifier 63 which is connected in a similar fashion to commutator 56 as was channel amplifier 37.

The output from commutator 31 is fed to transmitter 32 via a premodulation filter illustrated at 64. Premodulation filter performs the standard well understood processing of modulation signal such that signal bandwidth is limited to transmitter 32.

The relative thicknesses and materials from which the bulkheads and mounting members are made may be chosen to provide the desired degree of mechanical stability and weight to simulate the payload of the missile under test. Likewise, some latitude is available in the selection of electronic components used in the circuit of FIG. 4 provided that the well understood engineering tradeoffs of size, weight, reliability, and electrical parameters are recognized and the common precepts of the design practice are followed.

The foregoing description taken together with the appended claims constitute a disclosure such as to enable a person skilled in the electronics and telemetry arts and having the benefit of the teachings contained therein to make and use the invention. Further, the structure herein described meets the objects of the invention, and generally constitutes a meritorous advance in the art unobvious to such a worker not having the benefit of these teachings.

What is claimed is:

1. A telemetry system for a small diameter airframe comprising:

a cylindrical housing dimensioned to replace a payload portion of said airframe;

an antenna attached to said cylindrical housing and recessed to lie within a sub-diameter cylindrical surface;

a forward bulkhead extending across said cylindrical housing configured to provide mechanical support for said telemetry system and to serve as a heat sink;

a thermal battery mounted on the forward side of said forward bulkhead and in thermal transferring relationship therewith;

a mounting attached to the aft face of said forward bulkhead and extending rearwardly therefrom for support of a plurality of circuit boards;

a first circuit board supporting a power supply electrically connected to said thermal battery and mechanically connected to said mounting;

a second circuit board supporting a first monitor circuit having an input adapted for electrical connection to a source of electrical power on said airframe, having an output, and mechanically connected to said mounting;

a third circuit board supporting a hybrid circuit comprising a plurality of inputs, a plurality of outputs, and a plurality of operational amplifier monitor circuits connected between said inputs and said outputs;

a fourth circuit board supporting a commutator circuit having an output and having a plurality of inputs, one input connected to the output of said first monitor circuit, other inputs connected to each of said outputs from said third circuit board and at least four remaining inputs;

a radio transmitter mechanically supported by said mounting having a signal input connected to the output of said commutator and a radio frequency output connected to said antenna;

a fifth circuit board mechanically connected by said transmitter to said mounting and supporting a three axis acellerometer and interface circuitry having three outputs corresponding to the axis of said accelerometer and connected to three of said four remaining inputs of said commutator.

2. A telemetry system according to claim 1 further comprising an electrical connector mounted on said forward bulkhead having a plurality of conductors held in a predetermined spatial configuration for providing electrical connection to other electrical apparatus on said airframe.

3. A telemetry system according to claim 1 wherein said plurality of inputs on said third circuit board are connected to the plurality of electrical conductors by radio frequency filters.

4. A telemetry system according to claim 1 wherein said first monitor includes:

an AC to DC electrical converter whose output is a function of the frequency of said AC input; and an operational amplifier having an input connected to said AC to DC electrical converter.

5. A telemetry system according to claim 1 wherein said first circuit board supports a power monitor circuit having an input connected to the output of said thermal battery and an output connected to one of said four remaining inputs of said commutator.

6. A telemetry system according to claim 1 wherein said power supply includes a DC-to-DC converter for producing a balanced positive and negative voltage output.

7. A telemetry system according to claim 2 wherein said plurality of inputs on said third circuit board are connected to the plurality of electrical conductors by radio frequency filters.

8. A telemetry system according to claim 7 wherein said first monitor includes:

an AC to DC electrical converter whose output is a function of the frequency of said AC input; and an operational amplifier having an input connected to said AC to DC electrical converter.

9. A telemetry system according to claim 8 wherein said first circuit board supports a power monitor circuit having an input connected to the output of said thermal battery and an output connected to one of said four remaining inputs of said commutator.

10. A telemetry system according to claim 9 wherein said power supply includes a DC-to-DC converter for producing a balanced positive and negative voltage output.

* * * * *